United States Patent [19]

Hepler

[11] Patent Number: 5,587,188
[45] Date of Patent: *Dec. 24, 1996

[54] MULTITIP HOT RUNNER SYSTEM

[75] Inventor: Douglas C. Hepler, Rochester, N.Y.

[73] Assignee: Polyshot Corporation, Henrietta, N.Y.

[ * ] Notice: The term of this patent shall not extend beyond the expiration date of Pat. No. 5,464,343.

[21] Appl. No.: 303,495

[22] Filed: Sep. 9, 1994

Related U.S. Application Data

[63] Continuation-in-part of Ser. No. 249,089, May 25, 1994, Pat. No. 5,464,343, which is a continuation of Ser. No. 982,473, Nov. 27, 1992, abandoned.

[51] Int. Cl.$^6$ ................................................ B29C 45/22
[52] U.S. Cl. ........................ 425/549; 425/570; 425/572
[58] Field of Search ...................... 425/549, 572, 425/570, 568, 573, 190, 185; 264/328.15

[56] References Cited

U.S. PATENT DOCUMENTS

| | | | |
|---|---|---|---|
| 3,568,256 | 3/1971 | Johnson, Jr. | 425/570 |
| 3,758,252 | 9/1973 | Kohler | 425/570 |
| 4,034,952 | 7/1977 | Stewart | 425/572 |
| 4,173,448 | 11/1979 | Rees et al. | 425/549 |
| 4,921,708 | 5/1990 | Gellert | 425/568 |
| 4,964,795 | 10/1990 | Tooman | 425/549 |
| 5,032,078 | 7/1991 | Benenati | 425/549 |
| 5,217,730 | 6/1993 | Teng | 425/572 |
| 5,464,343 | 11/1995 | Hepler | 425/549 |

OTHER PUBLICATIONS

Excerpts from advertising materials of Mold Masters limited believed to have been published in 1989.
Excerpts from advertising materials of enrietti System believed to have been published prior to the filing date of this application.
Excerpts from advertising materials of Spear System, Inc. believed to have been published prior to the filing date of this application.
Excerpts from advertising material of DME believed to have been published prior to the filing date of this application.

*Primary Examiner*—Tim Heitbrink
*Attorney, Agent, or Firm*—Francis J. Caufield

[57] ABSTRACT

A multitip hot runner system for providing enhanced flexibility in the design, manufacture, and operation of multicavity molds. The system, which is self-contained, comprises a nozzle or manifold interface, externally heated flow passages, and interchangeable or replaceable tips. A fully hardened, generally rectangular parallelopiped shaped body permits a number of different multitip configurations, all of which maintain substantially uniform heating throughout the distribution architecture with the use of only a single thermocouple for temperature control. The parallelopiped shaped body is especially useful in molding parts arrayed in straight lines or in rectangular arrays.

9 Claims, 5 Drawing Sheets

MULTITIP HOT RUNNER SYSTEM

CROSS-REFERENCE TO RELATED APPLICATION

This application is a continuation-in-part of U.S. patent application Ser. No. 08/249,089 filed on May 25, 1994, now U.S. Pat. No. 5,464,343 issued on Nov. 7, 1995, which in turn is a continuation of U.S. patent application Ser. No. 07/982,473 filed on Nov. 27, 1992 and now abandoned.

BACKGROUND OF THE INVENTION

1. Field of The Invention

This invention in general relates to the field of injection molding and in particular to self contained hot runner systems.

2. Description of the Prior Art.

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. After emerging from the nozzle, the plasticized compound passes through a hole in a mold plate, usually stationary, and is then conveyed along a flow channel(s) to the mold cavity. The flow channel, depending on mold architecture, may comprise one or more sprue bushings and/or runner systems, which may or may not be heated for temperature control. Once in the cavity, the molten resin assumes the shape of the cavity and then is cooled to the point where it solidifies, acquiring the external shape of the cavity. The mold is then opened, and the part ejected or otherwise removed. The entire process is usually automated with clamping operations, injection, ejection, and part removal after cooling taking place under the control of a microprocessor or other form of automated controller.

For best process performance regardless of part size, it is known to be beneficial to control the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery may still run employing poor control techniques allowing the temperature of the resin to vary from the time it leaves the nozzle until it reaches a zone in the mold where temperature control is reacquired with, for example, internal heating channels in the mold.

Early on in mold practice, the most commonly used injection mold was one with a conventional runner system fed by a sprue. Such designs incorporated traditional unheated or cold sprue bushings to accept the melt delivered from the molding machine nozzle. Standard sprue bushings were available in a variety of styles and lengths to meet many anticipated molding applications. Such bushings, while unheated, were provided with standard spherical radii and orifice sizes to be compatible with available nozzles configurations, particularly those of more recent design.

Here, the runner system was cut at the parting line to route plastic to the cavities. Full round runners were, and still are, the most efficient and popular because they afforded the least heat loss per unit volume of material flow. While offering an economical approach to mold construction, the conventional runner system was most frequently employed for short-run applications. Its major disadvantage is the requirement for degating parts and the need for regrinding the runners and sprue, both labor intensive operations which do not readily lend themselves to automation.

Three plate molds were an improvement over the conventional mold approach in that they can automatically degate parts in the molding cycle and also allow the part to be gated on the top, usually a more desirable position for round parts. Because of the three plate scheme, two additional parting lines are available to allow automatic separation of the runner from the part. However, the three plate approach by itself afforded no additional advantage in terms of thermal control.

Consequently, no matter what type of molding strategy is employed, the runner and/or runner and sprue system must still function to get the material to the cavity with a minimum of loss of temperature and pressure. To achieve this purpose, those in molding arts have employed a number of approaches.

One is the insulated runner mold. Very few of these are built today because other runnerless molding technologies perform much better than this type. They are interesting, however, for historical reasons. This mold design relied on a very thick runner system whose outside regions would solidify with heat loss to form insulation at the outside of the runner. Closer to the center higher temperature was maintained because of lower heat loss due to the outside insulating properties, thus allowing the new melt to flow through the center in an open flow path. While easy to build, this style of mold was extremely difficult to run, particularly when cycle interruptions occurred. If new material was not frequently introduced into the system, the insulated runner would freeze, and the cull would have to be physically removed from the mold. As this was a frequent occurrence, the runner plates were latched together, and the machine clamping pressure was relied on to keep the plates from separating under injection pressure. While successful under some circumstances, like fast cycles and large shots using particular plastics, this type of mold largely is a thing of the past.

Next in terms of least expense for initial cost and continued maintenance is the internally heated runnerless molding system. In this system, material from the machine nozzle enters through a heated nozzle locator into the flow channel where heat is supplied to the plastic by a thermocouple cartridge heater located inside a distributor tube held in position by end caps. Melt is distributed to probes or to secondary distributor channels through either round bores in solid plates or trapezoidal channels in split-plate designs. The molten plastic flows along the gate probe to the gate and into the cavity.

These type of systems are relatively insusceptible to material leakage. They are constructed of solid blocks with gun-drilled distributor channels. The distributor plates are retained with Allen cap screws of sufficient strength to withstand the molding injection pressures. Such systems usually comprise pre-engineered components with application information being supplied on varied mini-prints for the moldmaker to design and build a mold compatible with available styles. As plastic is heated from the inside out, less power is required than with externally heated systems. Probes, located near the gate, provide heat to provide thermal control at the gate, allowing drool-free molding without gate freeze-up. Cycle interruptions of up to five minutes are possible without freezing the gate in these type of systems.

Externally heated runnerless molding systems called manifolds are heated, with either round cartridges or cast-in heaters, to a temperature sufficient to keep the plastic being processed in a molten condition. The machine nozzle mates to a nozzle seat in the form of a replaceable contact area. Plastic flows from the molding machine, through the nozzle seat, to a lead-in channel, and then into a primary flow channel. The primary channel delivers the plastic to bushing drops. The flow channels are bored into the manifold to form channels for plastic to flow. Additional flow channels may connect, forming secondary or even tertiary flow paths before ending at bushing drop locations. Specific bushing diameters and flow channel sizes are recommended based on flow volumes and material viscosity. Thermocouples are located at several locations within the manifold to monitor temperature and provide feedback information for control purposes.

More sophisticated practice, apparently not yet universally accepted, recognizes the advantages of controlling temperature by employing hot sprue bushings to convey material from the nozzle to the cavity gate, often times through the fixed mold plate, sometimes referred to as the "A" plate or base. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

In multicavity applications capable of providing more than one part per molding cycle, hot sprue bushings and internally heated molds, including those employing manifolds, generally occupy a large percentage of mold real estate per cavity. Consequently, it is a primary object of this invention to provide a highly reliable self-contained hot runner system that will provide the art with flexibility in the design, manufacture and operation of multicavity molds.

It is another object of this invention to provide a multi-tip hot runner system that may have its tips easily replaced or changed for a different style.

It is yet another object of the present invention to provide a self-contained hot runner system with only one thermocouple and yet provide balanced temperature and pressure control throughout its delivery architecture.

It is yet another object of the present invention to provide a self-contained multitip hot runner system available in a variety of configurations employing varying numbers of tips.

It is yet another object of the present invention to provide a self-contained hot runner system having an interface for use with an injection machine nozzle or a manifold.

It is still another object of the present invention to provide a self-contained hot runner system for molding parts arrayed in straight lines or rectangular arrays.

Other objects of the invention will, in part, be obvious and will, in part, appear hereinafter. A full understanding of the invention will best be had from reading the detailed description to follow in connection with the detailed drawings.

SUMMARY OF THE INVENTION

This invention relates generally to injection molding machinery and particularly to hot runner systems.

The invention is a multitip hot runner system for providing enhanced flexibility in the design, manufacture, and operation of multicavity molds of small overall footprint. The system, which is self-contained, comprises a nozzle or manifold interface, externally heated flow passages, and interchangeable or replaceable tips. A fully hardened body, generally rectangular parallelopiped in shape, permits a number of different multitip configurations all of which maintain substantially uniform heating throughout the distribution architecture with the use of only a single thermocouple for temperature control. Configurations are provided in a variety of tip styles including 4, 6, and 8 drop configurations. Heating is preferably via cartridges internal to the body with the number present depending on specific needs. The heating cartridges run generally parallel to the major dimension of the parallelopiped body and across the direction of flow. In each case, each flow channel feeding a tip is heated on both sides to provide a delivery system that is optimally balanced in both pressure and temperature so that part cavities are filled at substantially the same rate and speed for part consistency and quality.

In addition, all interface surfaces in the system are flush mounted through the use of lapped mating surfaces to eliminate the need for "O" rings.

The body shape provides enough load bearing material to assure correct transfer of forces throughout the mold and to prevent the system from experiencing deleterious effects due to flexing under load.

Finally, the system may be used alone or with others combined in manifolds to furnish multiple multitip arrangements for large part throughput yet small area. Arrangements such as single bars, "H"-shaped arrays, or bridged "H"-arrays are possible.

DESCRIPTION OF THE DRAWINGS

The structure and operation of the invention together with other objects and advantages thereof may best be understood by reading the detailed description to follow wherein the same reference numerals have been used throughout to designate the same part and wherein.

DETAILED DESCRIPTION

This invention comprises a fully self-contained hot runner system consisting of a nozzle or manifold interface, externally heated flow passages, and field replaceable tips. It employs a fully hardened distribution body that is generally in the shape of a rectangular parallelopiped and can be adapted for 4, 6, or 8 integrated tips, or some other number if required. Heating is preferably by internal resistive electrical heating cartridges placed within the hardened body, although other equivalents may be used. One zone of control monitors temperature via an independent thermocouple which is located in one half of the body and provides feedback to a well-known power controller for temperature control of all tips.

Figure 1:
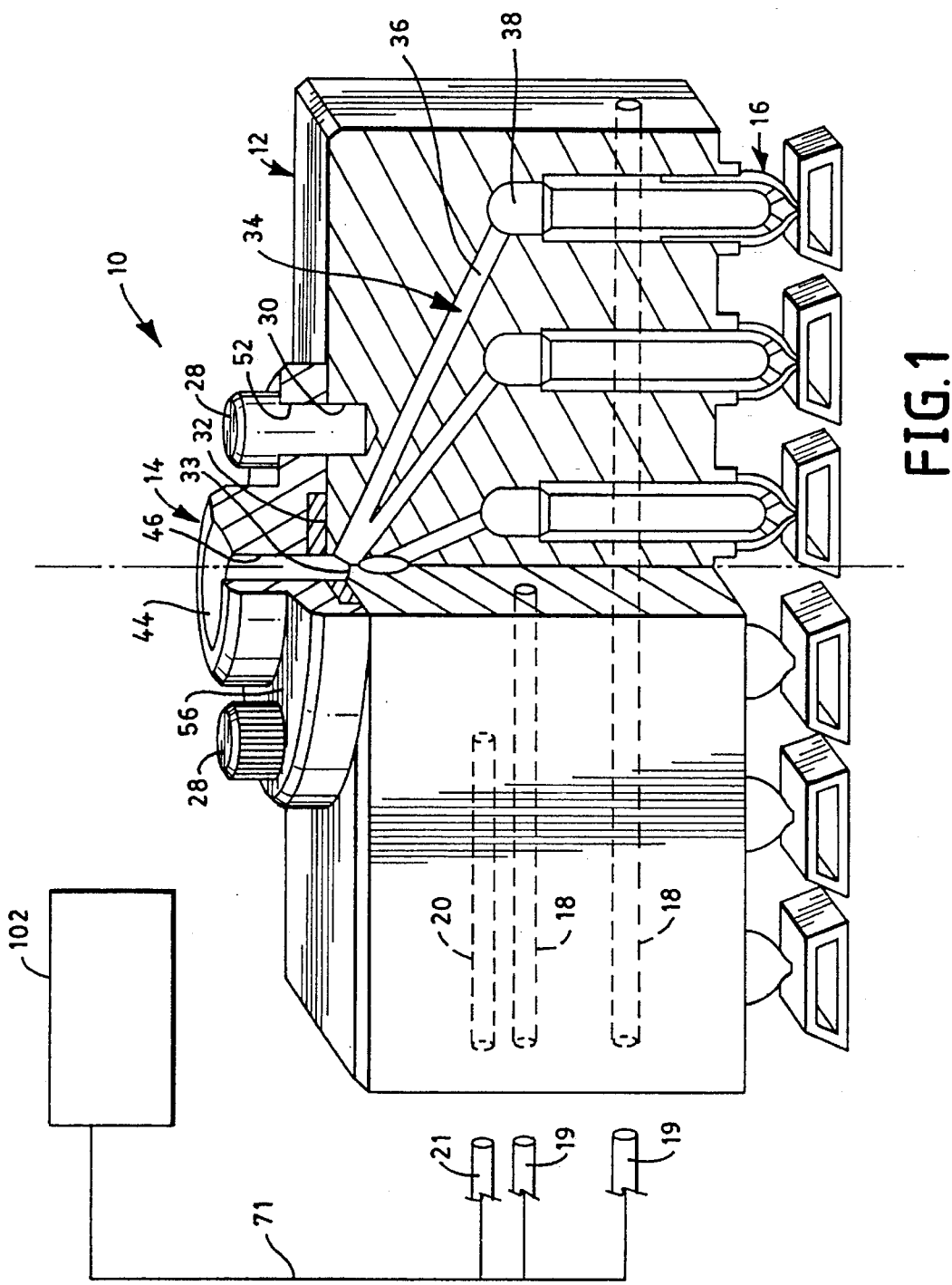
FIG. 1 is a diagrammatic perspective view of the multitip hot runner system of invention.

Referring now to FIG. 1, a six tip version of the inventive hot runner system is shown at 10. The six tip version is shown to illustrate the features and principles of operation common to all versions of the invention and is hereinafter referred to as "system 10". As can be seen, system 10, comprises three major parts: a generally rectangular, parallelopiped shaped body 12, a manifold/nozzle interface 14, and a plurality of heat conducting tips 16 (only one designated as typical) extending proud of the bottom of body 12 from which molten plastic is introduced to mold cavities via their gates as will become more readily apparent. Tips 16 are identical to one another so are to be considered typical in material composition and design in each of the embodiments of the invention. In preferred form, system 10 is approximately 2.5 inches high and has a length that is determined by the number of tips present. A typical length for a four or six tip version is approximately five inches with spacing between tips different for the different number of tips present. For four tips in this typical length the spacing is typically 1.25 inches and for six, it is 0.75 inches.

Indicated in FIG. 1 as equally spaced dotted holes 18 ( there are two in all for this version, see FIG. 3) for receiving heating cartridges generally indicated at 19. Heating cartridges 19, which themselves are not inventive in themselves, and are resistance type elements of well-known design that operate preferably at 208 to 230 volts A.C. They are readily commercially available and can be fabricated to provide uniform or variable heating power throughout their length. Here, the heating elements preferably deliver variable heating along their length for reasons to be discussed. As can be appreciated, heating cartridges 19 are mounted parallel to the base of body 12, or generally perpendicular to the direction of plastic flow as will be more apparent hereinafter.

The single hole 20 represents the single thermocouple of the invention. In all versions of the invention, thermocouple 20, which is conventional and only diagrammatically shown at 21, is in only one-half of body 12, preferably located as shown between inboard tips and slightly above the uppermost heating cartridge hole 18 (See also FIG. 3) to closely monitor the temperature at a location in body 12 such that the temperature in all tips will be sufficiently close for optimal flow control.

Body 12 is preferably constructed of fully hardened steel for strength and ruggedness and serves as the primary means for distributing plastic from the injection nozzle (see "70" in FIG. 5) to tips 16 as well as housing heating cartridges 19 and thermocouple 21. The hardened steel may be, for example, A10, S7, or P20.

Figure 2:
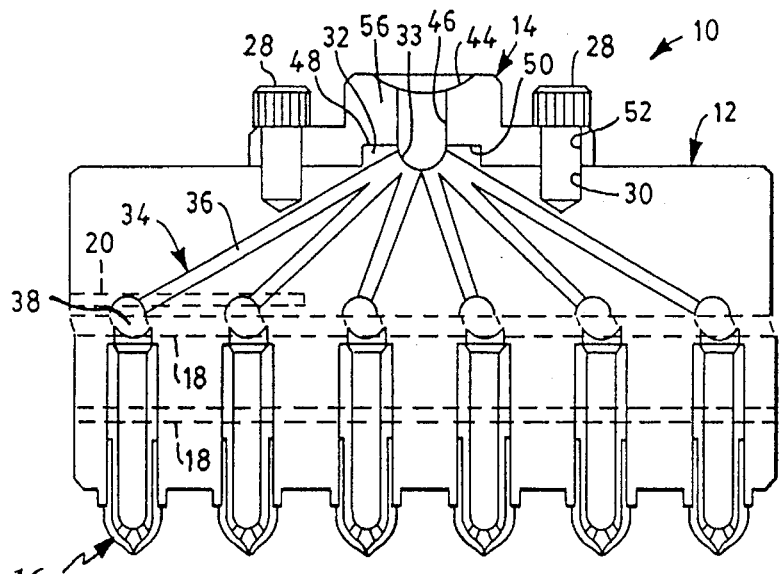
FIG. 2 is an diagrammatic cross-sectional elevational view of part of the invention of FIG. 1 taken generally along line 2—2 thereof showing only typical parts while omitting like parts in the section for purposes of clarity.
Figure 4:
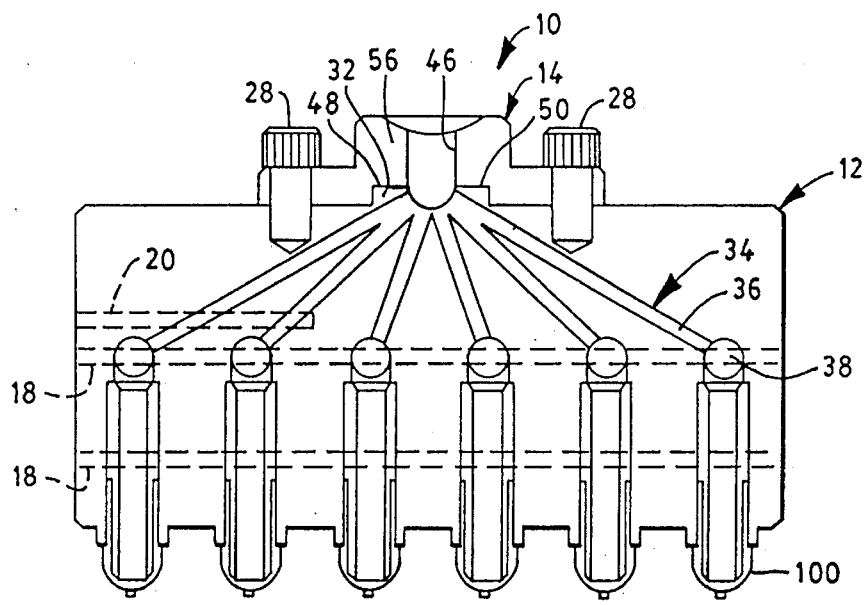
FIG. 4 is a diagrammatic fragmentary view, partial sectional, view showing an alternate tip configuration for use with the invention.

As best seen in FIGS. 2 and 4, the top of body 12 is provided with an upwardly extending boss 32 whose top surface is provided with a lapped fit for reasons which will become apparent. Centered in boss 32 is a hemispherical well 33 that serves as a distribution chamber from which molten plastic is fed to the body 12's various flow channels. A typical unrestricted flow channel is illustrated at 34. Each flow channel 34 comprises and upper section 36 and lower section 38. Upper section 36 angles from distribution well 33 outwardly and downwardly from the center of body 12 until it meets lower section 38 which parallels the center of body 12. Thus, molten plastic which enters well 34 is equally divided among the various body flow channels 34 as it is conducted outwardly away from its center while traveling to the end of tips 16. Even though the distance from well 33 to each tip is slightly different, the differences are so small given the scale of the system that cavities fill in substantially the same time.

Each lower section 38 is threaded to receive a complementary threaded section of a tip 16. This is best seen FIG. 6 which shows that each tip 16 comprises a threaded head 19, a neck 21 which is reduced in diameter compared with the internal diameter of lower section 38 to provide an air gap 23 between them, and a pair of holes 17 through which molten plastic can flow. Tips 16 are preferably made of a material having high heat conducting properties such as beryllium copper or similar materials. Because of the equal spacing of flow channels 34, plastic from well 33 is equally distributed to each because all experience equal pressure and the flow channels and tips are all of similar geometry so as to afford equal resistance to plastic flow.

Figure 3:
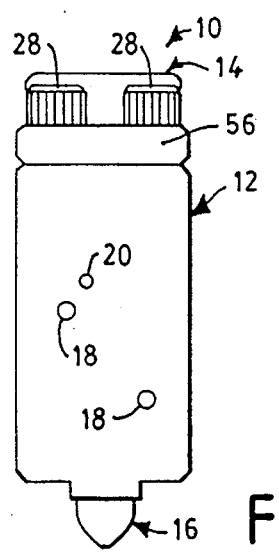
FIG. 3 is a diagrammatic side elevational view of the invention of FIG. 1.

As can be further seen in FIGS. 1, 2 and 3, each heating cartridge 19 fits into a corresponding hole shown typically at 18. Holes 19 begin in the side surface of body 12 (See FIG. 3) and extend substantially the full width of body 12 as seen in FIGS. 1 and 2. As mentioned, hole 20 is provided to receive thermocouple 21 which is preferably positioned between to of the most outboard tips 16 on one side of the center of body 12. As best seen in FIG. 2, each heating cartridge being horizontally arranged, transverse to the flow channels, and on both sides thereof and one slightly above the other, heat each flow channel and tip so that every flow channel and tip is heated from both sides and vertically for substantially even heating in the vertical direction.

Moreover, it should be apparent that the relative and equal spacing of each flow channel with respect to each heating cartridge assures that each heating cartridge is heating substantially the same thermal mass in each case. However, because of the bilaterally symmetric nature of this geometry (about centerline CL), the system tends to cool faster toward its outboard ends. Therefore, heating cartridges 19 are wound so that they provide more heat near the outboard tips than those closest to the centerline, CL. In this manner, even though there is some bilateral symmetry in the amount of heat loss, it is compensated for by the heater design. Consequently, only one thermocouple is needed since the heating with this configuration is also bilaterally symmetric about the centerline, CL.

No matter how many tips are used in the invention, this principle is followed in every case to assure every flow channel is substantially identically heated to every other. For this invention, this is done by using a rectangular geometry, but the invention may be practiced with other geometries so long as this principle of equal distribution of heat is adhered to. With this in mind, it can now be appreciated that a single thermocouple can be used to control the temperature of every flow channel since all experience the same thermal environment. The single thermocouple need not be near a tip because heating in the vertical direction is sufficiently uniform along that azimuth due to the small vertical height.

Referring to FIGS. 1 and 2 again, it can be seen that the nozzle/manifold interface 14 comprises a main body 51, also of steel as, for example, either A10, S7, or P20 steel, with a central flow channel 46. The entrance to flow channel 46 is in the form of a hemispherical depression 44 that is dimensioned to mate with standard ball diameters available on injection nozzles in use throughout the industry. The bottom of flow channel 46 terminates in a recess 48 having a bottom surface 50 that is lapped to mate with the lapped surface of boss 32. These two lapped surfaces mate exactly against one another to provide a tight seal which prevents plastic from leaking as it flows from channel 46 to well 33. Along with its other features, this one is also an important feature of the invention since it eliminates the need for the traditional "O"-rings in common use.

Interface 14 bolts to body 12 via a series of bolts 28 which pass through equally spaced holes 52 located in a flange 56 surrounding the bottom of interface 14. Bolts 28 fit into corresponding holes 30 a typical one of which is shown in FIG. 2. As best seen in FIG. 1, bolts 28 are located near the center of body 12 where the flow channels are shortest and as such tend to assure uniform thermal mass properties for equal heating.

All of the inventive multitip systems being rectangular, parallelopiped shaped fully support the mold cavity and safely transfers the molding machine nozzle force through the mold base assembly in a manner to be explained. With this feature, the multitip system allows the mold cavity to experience less flexing and hence last longer.

All tips 16 are made of very high, thermally conductive material as already mentioned. In addition, each tip 16 is provided with several coatings of wear and abrasion resistant plating to enhance their reliability and useful life. As can be appreciated, tips 16 because they are threaded in body 12 are easily replaced in the field by the user. The "P" or pinpoint style tips illustrated are recommended where minimal gate vestige is required.

Figure 5:
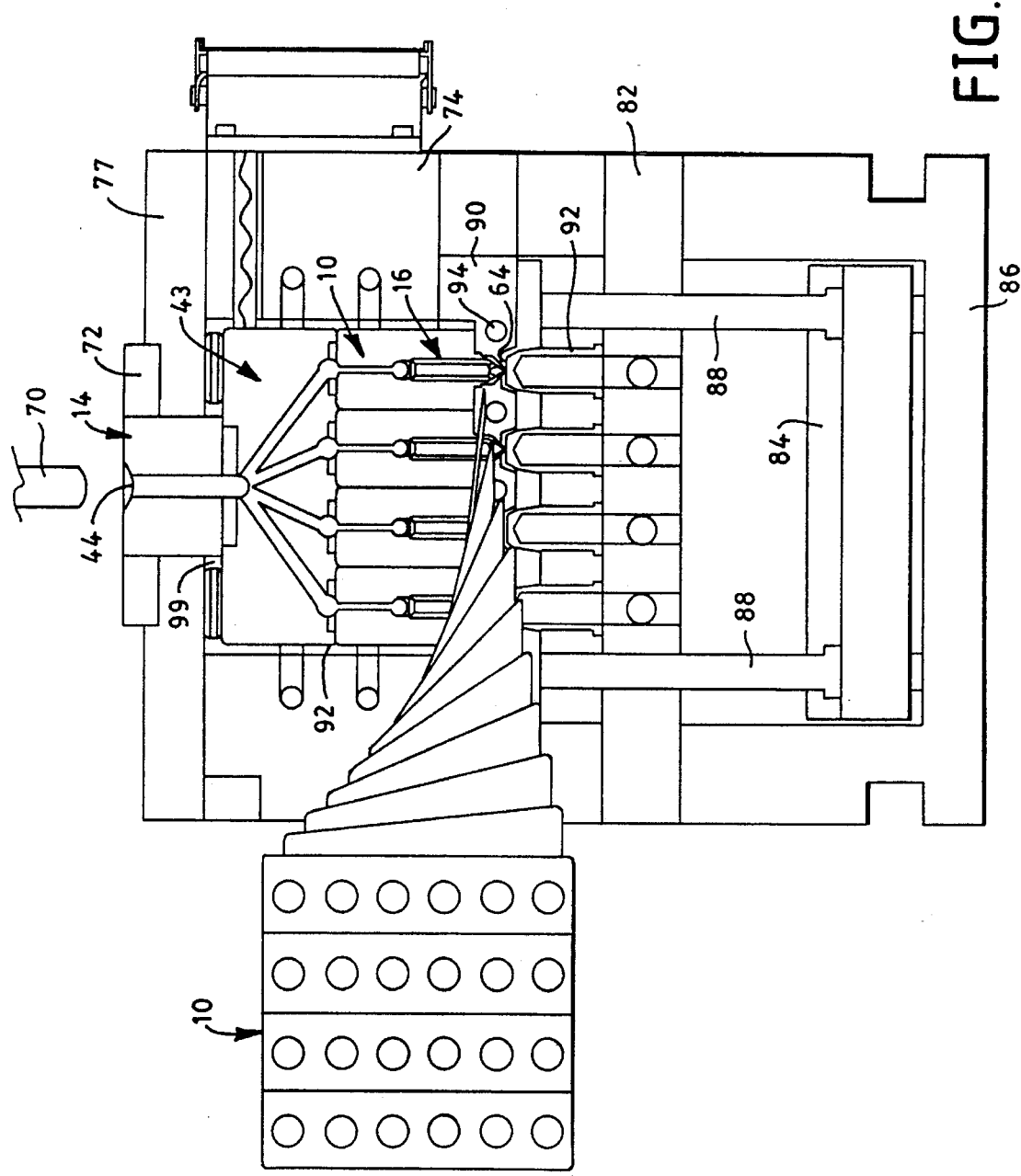
FIG. 5 is a diagrammatic elevational view showing the system of FIG. 1 in a molding system with some parts of each shown in section and others not.

Reference is now made to FIG. 5 which shows a typical mold layout with which multitip system(s) 10 of the invention may be used. As shown, the mold layout from the top down comprises first the injection machine nozzle 70. Nozzle 70 which mates with a manifold version of body 12 that is without tips but rather just flow channels. This is designated at 43 and is in all other respects similar to system 10. However, it will become apparent how tipless system 43 allows the use of a plurality of systems 10 in the mold layout of FIG. 5.

Nozzle 70 interfaces with recess 44 in the top of interface 14. This is surrounded by a mold locating ring 72 in turn located in a top clamp plate 77. Other elements of the mold layout comprise the "A" plate 74, stripper plate 82, ejector retainer plate 84, ejector plate 86, ejector return pins 88, cavity block 90, cavity molds 92, typical, and cavity cooling lines 94, typical. Also shown are part cavities, typically at 64. Wiring from heater cartridges 18 and thermocouple 20 are conducted from system 10 via a wiring race 73 in "A"-plate 74 where such wires are indicated generally at 71. The wires lead to a well-known temperature controller 102 for providing feedback control.

System 10 and 43 are shown partially surrounded by "A"-plate 74 and top clamping plate 77. They are thermally isolated from these mold elements via air gaps one of which is shown at 97 and the other at 99.

Figure 6:
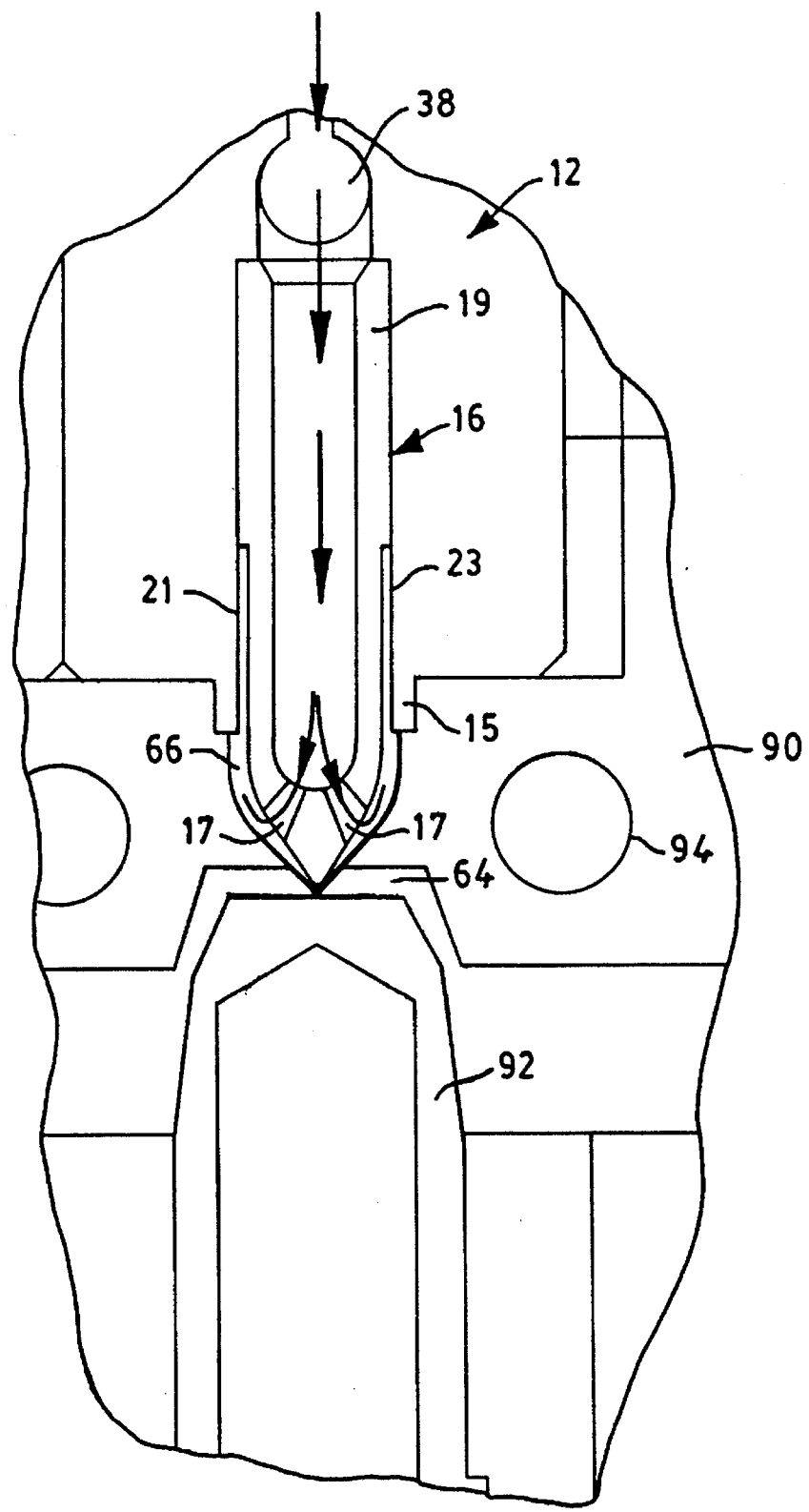
FIG. 6 is a diagrammatic sectional view of a part of the invention of FIG. 1 with parts broken away and shown in conjunction with other parts of the molding system of FIG. 5 in which the invention may be used where the parts of the molding system are also shown in elevational section with parts broken away.

It is also to be noted that each tip 16 emerges from the bottom of body 12 via corresponding bosses indicated typically by numeral 15 (See FIG. 6). Bosses 15 assist in properly positioning system 10 in the mold layout so that tips 16 are properly aligned with mold cavity gates. In addition, their exit diameters are slightly larger that the reduced diameter necks 21 of tips 16 for reasons to follow.

Referring now to FIG. 6, there is illustrated in enlarged fashion more detail on how the tips 16 of system 10 mate with the gate of a cavity 64 formed between cavity block 90 and mold 62. As seen, boss 15 fits in registration with a complementary configured corresponding recess in cavity block 60. Also in block 60 is machined a well 66 for receiving molten plastic. Well 66 is shaped with a geometry similar to that of tips 16 but larger and slightly tapered as it approaches the cavity gate. The very end of tip 16 also is carefully kept away from the cavity gate by a distance, S, empirically determined to maintain flow and typically a few thousandths of an inch. Well 66 also communicates directly with air gap 23 formed in a manner previously described. As such, gap 23 and well 66 fill with molten plastic to provide additional thermal isolation between system 10 and the remaining elements of the mold. As heat is always conducted to the extreme end of tip 16 because of its high heat conducting properties, and this is generally the location where temperature is monitored via thermocouple 20, gate "freeze" with system 10 very rarely can occur.

Figure 8:
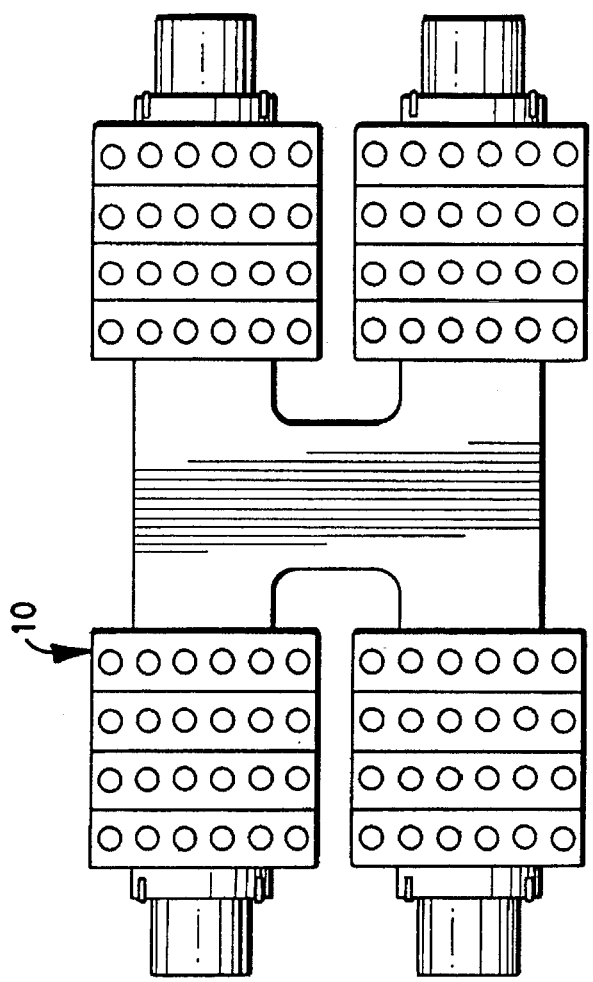
FIGS. 7 and 8 are bottom views of alternate multiple multitip designs of the invention showing single bar and "H"-shaped manifold architectural configurations. respectively.
Figure 7:
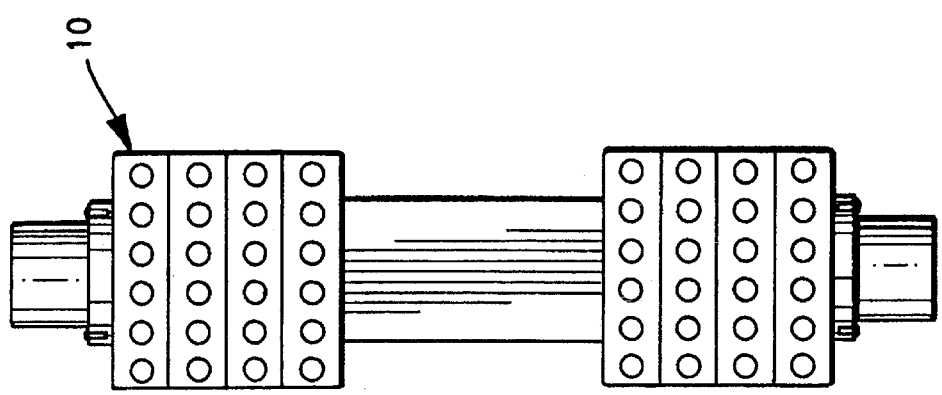

As mentioned earlier, multitip systems are available for use in several different architectures as shown in FIGS. 7 and 8. These various architectures allow the mold designer to select the number of cavities to be filled per individual module. Because of the rectangular nature of the body, several can be arranged or stacked aside of one another in different locals in the mold architecture to mold parts arrayed in a line or in one or more two-dimensional arrays. FIG. 7 represents and "T"-configuration while FIG. 8 illustrates an "H"-configuration. It is also possible to use one multitip module with several tips injecting only one part. This is especially useful when critical part symmetry is required. In all versions, the principle of presenting equal thermal mass to each heating cartridge is strictly followed so that only one thermocouple is needed.

FIG. 4 shows that different tip configurations may be used with the body of the invention by a simple screw operation to make the change. Here, full flow tips designated typically at 100 are shown. These are designed to provide maximum flow where large volume parts are being molded and cavity fill time is a factor.

Those skilled in the art may make changes to the invention without departing from the scope of its teachings. For example, it has already been mentioned that the multitip system of the invention may be used in different manifold configurations to maximize the number of part cavities in as small an area as possible. These include the single bar, H-style, star, single plate and bridge style. All of these type configurations constitute optimally balanced material flow systems. This allows each part being molded to fill at substantially the same rate of pressure and speed resulting in excellent shot-to-shot consistency, while at the same time improving molded part quality. If required and desired the diameters of the outboard flow channels may be enlarged as needed to aid in balancing material flow. Also, the distribution body geometry may also be square, and this shape is intended to be encompassed by the expression rectangular, parallelopiped. Therefore, it is intended that the embodiments described above be considered as illustrative and not be construed in a limiting sense.

What is claimed is:

1. A multitip hot runner apparatus for transporting molten plastic from an injection machine to a plurality of mold cavities while controlling the temperature of the molten plastic, said apparatus comprising:

a generally rectangular, parallelopiped shaped distribution body fabricated of a single piece of metal, having a predetermined depth, and being bilaterally symmetric about a centerline, said distribution body having top, bottom, and side surfaces, a distribution well formed in said top surface for receiving molten plastic, a plurality of unrestricted and substantially identically configured through flow channels formed between said distribution well and said bottom surface of said distribution body to transport molten plastic in a general direction of flow from said distribution well along said flow channels and toward said bottom surface, each of said through flow channels having lower sections adapted to releasably receive tips for transporting molten plastic beyond said bottom surface to gates of respective mold cavities and being aligned aside of one another generally in a line with a predetermined spacing between them, a plurality of heater holes equally spaced within said distribution body with respect to said flow channels so that each flow channel is surrounded in said distribution body by a substantially identical thermal mass to assure uniform heating of said flow channels when heaters present in said distribution body are energized, said heater holes extending parallel to said top and bottom surfaces of said distribution body, transverse to said general direction of flow, and a single non-through thermocouple hole, extending from one side of said distribution body, horizontally and parallel to said heater holes to a predetermined length short of said distribution body centerline; said thermocouple hole being arranged to facilitate monitoring of the temperature at a location in one of said distribution body's bilaterally symmetric halves;

each of said plurality of heaters being disposed in a corresponding one of said plurality of heater holes;

a thermocouple disposed in said thermocouple hole for monitoring the temperature of said distribution body and supplying temperature feedback information for controlling the temperature of all of said flow channels; and a plurality of tips, each of said tips being releasably engaged within a respective one of said lower sections of said flow channels to form an air space to prevent heat loss, said tips being fabricated of a material with high heat conducting properties relative to those of said distribution body to conduct heat from said distribution body outside of said bottom surface thereof to prevent plastic freeze at cavity gates; and a interface body attached to said distribution body for receiving molten plastic and transporting it to said distribution well of said distribution body.

2. The apparatus of claim 1 wherein said heaters provide more heat at the outboard sides of said distribution body than near said centerline thereof.

3. The apparatus of claim 1 wherein said tips are fabricated of beryllium copper.

4. The apparatus of claim 1 wherein said tips and said lower sections of said plurality of flow channels have complementary configured threads to allow said tips to be releasably screwed to said distribution body.

5. The apparatus of claim 1 wherein said interface body and said distribution body have complementary lapped mating surfaces to provide a seal between said interface body and said distribution body for preventing molten plastic from escaping from said apparatus when said interface body is attached to said distribution body.

6. The apparatus of claim 1 wherein said interface body and said distribution body are both fabricated of hardened steel.

7. The apparatus of claim 1 wherein said interface body is circularly symmetric.

8. The apparatus of claim 1 wherein said distribution body is fabricated of hardened steel selected from the group consisting of A10, P20, and S7.

9. The apparatus of claim 1 wherein said heater holes are positioned on both sides of said flow channels.

* * * * *